(12) United States Patent
Kajale et al.

(10) Patent No.: US 9,731,632 B2
(45) Date of Patent: Aug. 15, 2017

(54) SEAT ASSEMBLY HAVING AN ACTUATOR MEMBER

(71) Applicant: Lear Corporation, Southfield, MI (US)

(72) Inventors: Vikrant Kajale, Oberding (DE); Kishore Tarade, Ergolding (DE)

(73) Assignee: Lear Corporation, Southfield, MI (US)

( * ) Notice: Subject to any disclaimer, the term of this patent is extended or adjusted under 35 U.S.C. 154(b) by 274 days.

(21) Appl. No.: 14/595,567

(22) Filed: Jan. 13, 2015

(65) Prior Publication Data

US 2015/0202996 A1   Jul. 23, 2015

(30) Foreign Application Priority Data

Jan. 17, 2014  (DE) .................. 10 2014 200 753

(51) Int. Cl.
*B60N 2/20* (2006.01)
*B60N 2/22* (2006.01)

(52) U.S. Cl.
CPC ............. *B60N 2/206* (2013.01); *B60N 2/20* (2013.01); *B60N 2/22* (2013.01)

(58) Field of Classification Search
CPC ............ B60N 2/20; B60N 2/206; B60N 2/22
USPC .................... 297/363, 367 R, 378.11–378.14
See application file for complete search history.

(56) References Cited

U.S. PATENT DOCUMENTS

| | | | | |
|---|---|---|---|---|
| 4,869,541 A | | 9/1989 | Wainwright | |
| 5,507,553 A | * | 4/1996 | Nishizawa | B60N 2/433 |
| | | | | 297/216.13 |
| 5,788,330 A | * | 8/1998 | Ryan | B60N 2/2354 |
| | | | | 297/367 R |
| 6,120,098 A | * | 9/2000 | Magyar | B60N 2/20 |
| | | | | 297/344.11 |
| 7,434,885 B2 | | 10/2008 | Becker et al. | |
| 7,494,186 B2 | | 2/2009 | Paing et al. | |
| 7,648,205 B2 | * | 1/2010 | Zou | B60N 2/2358 |
| | | | | 297/367 R |
| 8,480,175 B2 | | 7/2013 | Muck | |
| 8,491,054 B2 | * | 7/2013 | Myers | B60N 2/20 |
| | | | | 297/378.1 |
| 9,440,558 B2 | * | 9/2016 | Abraham | B60N 2/206 |
| 2005/0212341 A1 | * | 9/2005 | Coughlin | B60N 2/206 |
| | | | | 297/378.12 |
| 2010/0013289 A1 | * | 1/2010 | Kumazaki | B60N 2/22 |
| | | | | 297/378.12 |
| 2011/0127821 A1 | * | 6/2011 | Wojatzki | B60N 2/2358 |
| | | | | 297/354.12 |
| 2011/0181088 A1 | * | 7/2011 | Zhang | B60N 2/2362 |
| | | | | 297/367 P |
| 2011/0204692 A1 | * | 8/2011 | Holder | B60N 2/3011 |
| | | | | 297/366 |
| 2012/0217781 A1 | * | 8/2012 | Nock | B60N 2/12 |
| | | | | 297/354.12 |
| 2014/0110985 A1 | * | 4/2014 | Yamaguchi | B60N 2/68 |
| | | | | 297/354.1 |

* cited by examiner

*Primary Examiner* — Syed A Islam

(74) *Attorney, Agent, or Firm* — Brooks Kushman P.C.

(57) ABSTRACT

A seat assembly having a seat back pivotally disposed on a seat bottom. The seat assembly may include an actuator member that may be configured to rotate about a first axis and a cam member that may be configured to rotate about a second axis that may be spaced apart from the first axis.

20 Claims, 8 Drawing Sheets

SEAT ASSEMBLY HAVING AN ACTUATOR MEMBER

TECHNICAL FIELD

This patent application relates to a seat assembly that may have an actuator member.

BACKGROUND

A seat back hinge mounting for a forwardly foldable motor vehicle seat is disclosed in U.S. Pat. No. 7,434,885.

SUMMARY

In at least one embodiment, a seat assembly is provided. The seat assembly may include a seat bottom, a seat back, an actuator member, and a cam member. The seat back may be pivotally disposed on the seat bottom. The seat back and the actuator member may be configured to rotate about the first axis. The actuator member and the cam member may rotate in opposite directions when the actuator member actuates the cam member.

In at least one embodiment, a seat assembly is provided. The seat assembly may include a seat bottom, a seat back, a recliner mechanism, and an actuator member. The recliner mechanism may rotatably couple the seat back to the seat bottom. The actuator member may be disposed proximate the recliner mechanism. The actuator member may be rotatable about the first axis. The actuator member may include an actuator body and an actuator ring. The actuator body may have a bore. The actuator ring may be received in the bore. The actuator ring may rotate in the bore with respect to the actuator body when the recliner mechanism is actuated from a locked position to an unlocked position. The recliner mechanism may inhibit rotation of the seat back about the first axis in the locked position. The recliner mechanism may permit the seat back to rotate about the first axis in the unlocked position.

In at least one embodiment, a seat assembly is provided. The seat assembly may include a seat bottom, a seat back, a cam member, and an actuator member. The seat back may rotate about a first axis with respect to the seat bottom. The cam member may be disposed proximate the seat bottom and may rotate about a second axis. The actuator member may rotate about the first axis and may have a first arm and a second arm. The second arm may rotate the cam member about the second axis when force is exerted on the first arm to rotate the actuator member about the first axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
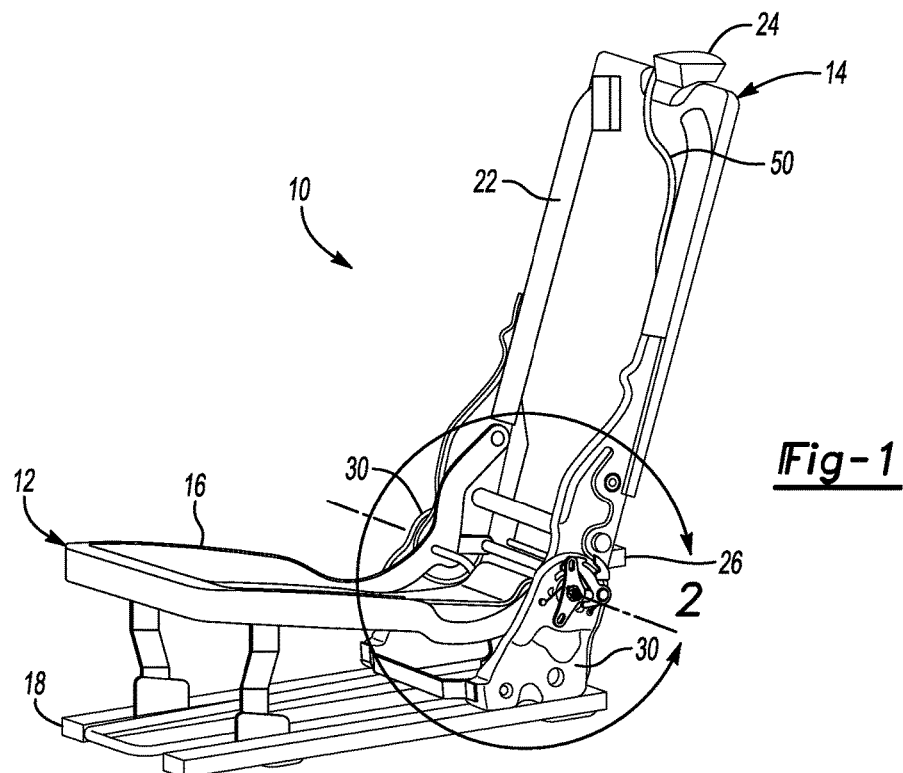
FIG. 1 is a perspective view of a portion of a seat assembly.

Referring to FIG. 1, an exemplary seat assembly 10 is shown. The seat assembly 10 may be configured for use with a vehicle, such as a motor vehicle like a car or truck. In FIG. 1, the seat assembly 10 is shown without a trim cover or seat cushion to better show internal components of the seat assembly 10. The seat assembly 10 may include a seat bottom 12 and a seat back 14.

The seat bottom 12 may be configured to support a seat occupant. The seat bottom 12 may include a seat bottom frame 16. The seat bottom frame 16 may support a seat cushion upon which a seat occupant may be disposed when seated. In at least one embodiment, the seat bottom frame 16 may be disposed on a slidable seat track 18. At least a portion of the seat bottom 12 may be fixedly positioned or may be stationary with respect to a support surface, such as a vehicle body or floor pan, when installed in a vehicle. For instance, a lower portion of the seat track 18 may be fixedly mounted to the support surface while an upper portion of the seat track 18 may be coupled to the seat bottom frame 16 and may slide in a forward/backward direction relative to the lower portion of the seat track 18.

The seat back 14 may be configured to rotate, pivot, or fold with respect to the seat bottom 12. More specifically, the seat back 14 may be configured to rotate or pivot about a first axis 20 with respect to the seat bottom 12. The first axis 20 may extend in a lateral direction with respect to the vehicle and the seat assembly 10. The seat back 14 may include a seat back frame 22 that may pivot with respect to the seat bottom frame 16 between a design position and a table fold position.

Figure 2:
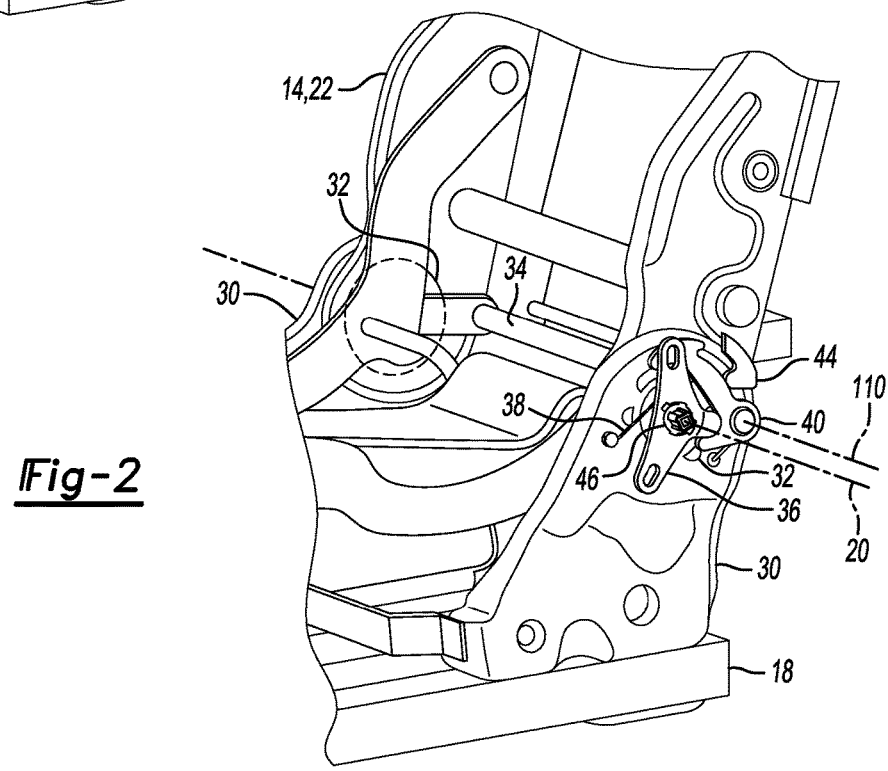
FIG. 2 is a magnified view of a portion of the seat assembly of FIG. 1.
Figure 6:
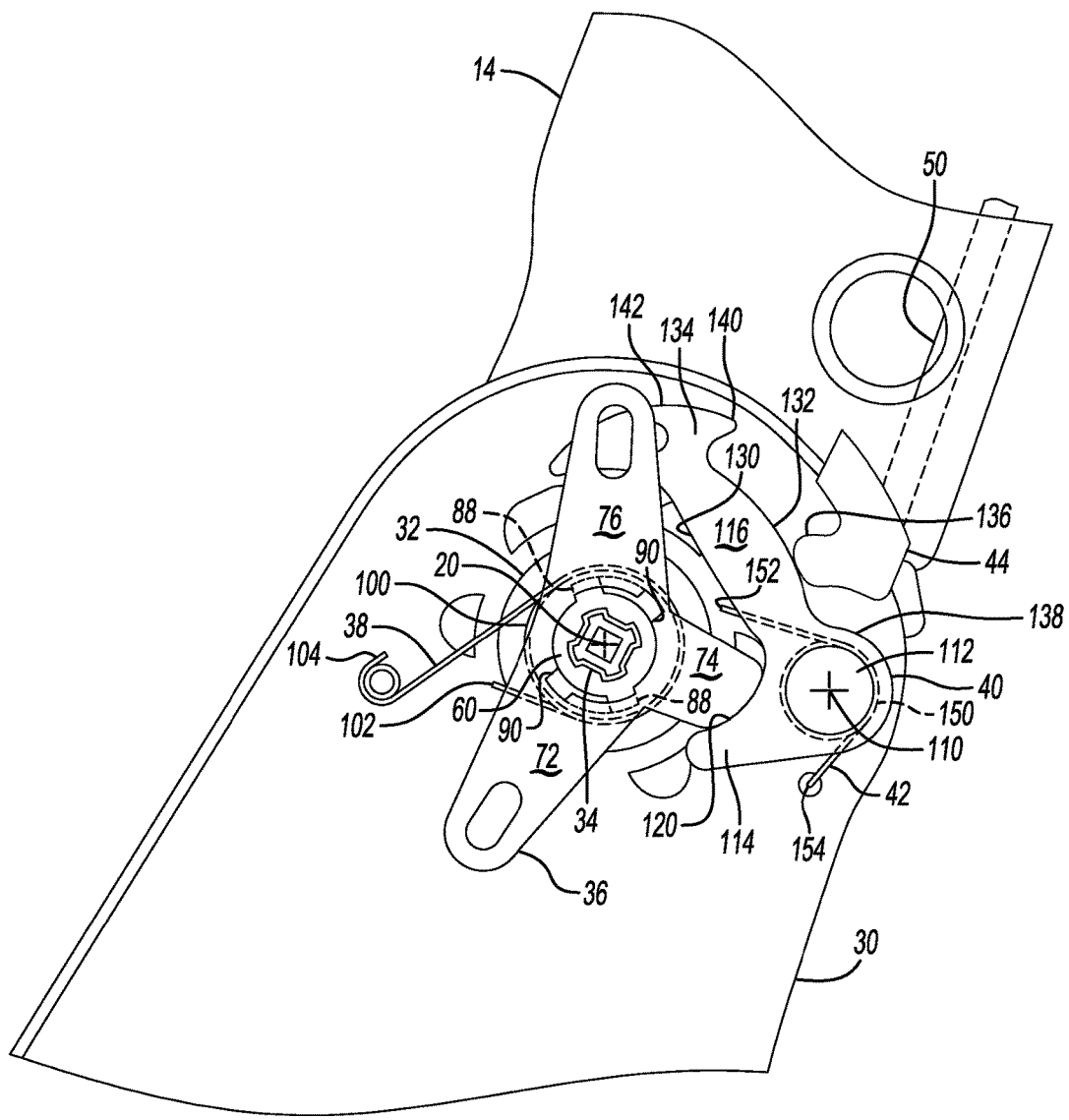
FIG. 6 is a side view of the seat assembly in a design position.

In FIGS. 1, 2 and 6, the seat back 14 and seat back frame 22 are shown in an exemplary design position in which the seat back 14 may not be folded over the seat bottom 12. The design position may be referred to as a nominal seating position, default position, or normal use position that may allow a person to occupy the seat assembly 10. The seat back 14 may be reclined or angled slightly backward from vertical when in the design position.

Figure 10:
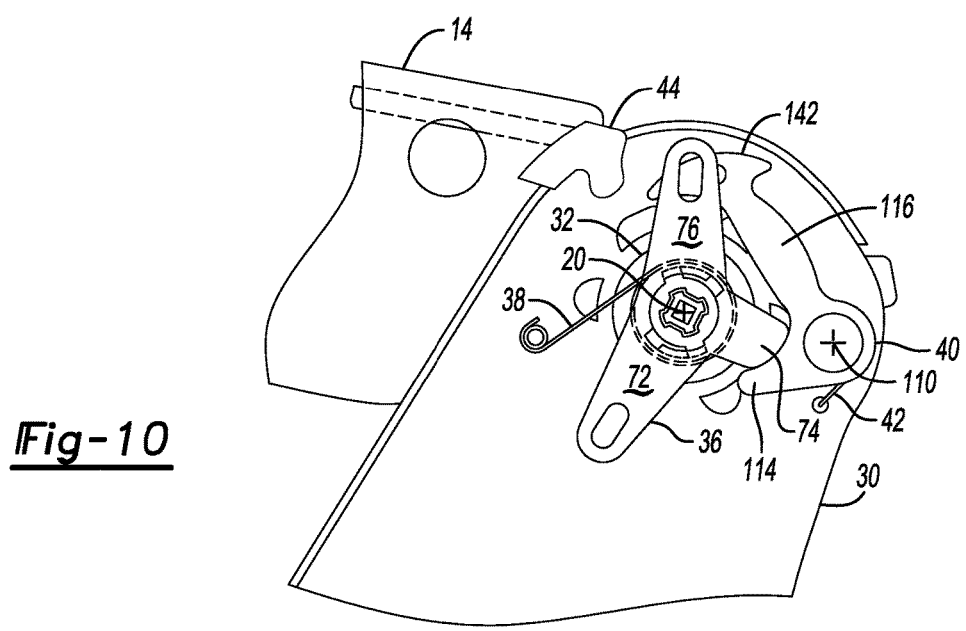
FIG. 10 is a side view of the seat assembly in the table fold position.

In FIG. 10, the seat back 14 is shown in an exemplary table fold position or folded position. The seat back 14 may be folded over the seat bottom 12 when in the table fold position. For example, the seat back 14 may be folded over the seat bottom 12 such that the seat back 14 or a trim cover of the seat back 14 may engage the seat bottom 12 or a trim cover of the seat bottom 12. The seat back 14 may extend in a generally horizontal direction when in the table fold position.

Referring to FIG. 1, an easy entry lever 24 may be provided with the seat assembly 10. For example, the easy entry lever 24 may be provided with the seat back 14 and may be configured to release the seat back 14 to allow the seat back 14 to move from the design position toward an easy entry position that may be disposed between the design position and the table fold position as will be discussed in more detail below. The easy entry lever 24 may be disposed in any suitable location. In FIG. 1, the easy entry lever 24 is disposed proximate a top of the seat back 14.

A release lever 26 may also be provided with the seat assembly 10. The release lever 26 may be provided with the seat back 14 and may be configured to release the seat back 14 to allow the seat back 14 to move toward the table fold position as will be discussed in more detail below. The release lever 26 may be disposed in any suitable location. In FIG. 1, the release lever 26 is disposed proximate a rear side or back side of the seat back 14 so that it may be accessible to a person located behind the seat assembly 10, such as a rear seat occupant.

Referring to FIGS. 2 and 6, the seat assembly 10 may include various components that may interconnect the seat bottom 12 to the seat back 14 and/or facilitate pivoting of the seat back 14 with respect to the seat bottom 12. In at least one embodiment, the seat assembly 10 may include a lower bracket 30, a recliner mechanism 32, a synchronization tube 34, an actuator member 36, an actuator member spring 38, a cam member 40, a cam member spring 42, and a stop member 44.

The lower bracket 30 may be associated with the seat bottom 12 and the seat bottom frame 16. In FIG. 2, two lower brackets 30 are provided and are disposed on opposite lateral sides of the seat assembly 10. The lower bracket 30 may be disposed proximate the back side or rear side of the seat bottom 12 and may extend in a generally vertical direction from the seat track 18 toward the seat back 14. In at least one embodiment, the lower bracket 30 may be fixedly disposed on the seat bottom frame 16 and may be fixedly disposed on the upper track of the seat track 18.

The recliner mechanism 32 may be configured to control rotation or pivoting of the seat back 14 about the first axis 20. One or more recliner mechanisms 32 may be provided with the seat assembly 10. For example, a pair of recliner mechanisms 32 may be provided on opposite lateral sides of the seat assembly 10. The recliner mechanism 32 may be configured as a disc shaped recliner mechanism and may include a first plate and a second plate that may rotate about the first axis 20 with respect to the first plate. The first plate, which may also be referred to as a fixed plate, may be fixedly disposed on a component that may be associated with the seat bottom 12, such as the lower bracket 30. The second plate, which may also be referred to as a rotating plate, may be fixedly disposed on a component that may be associated with the seat back 14, such as the seat back frame 22. As such, the recliner mechanism 32 may be disposed between the lower bracket 30 and the seat back frame 22 in one or more embodiments.

The recliner mechanism 32 may be actuated between a locked position and an unlocked position. Rotation of the seat back 14 about the first axis 20 or rotation of second plate with respect to the first plate may be inhibited when the recliner mechanism 32 is in the locked position. Rotation of the seat back 14 about the first axis 20 or rotation of second plate with respect to the first plate may be permitted when the recliner mechanism 32 is in the unlocked position.

Figure 3A:
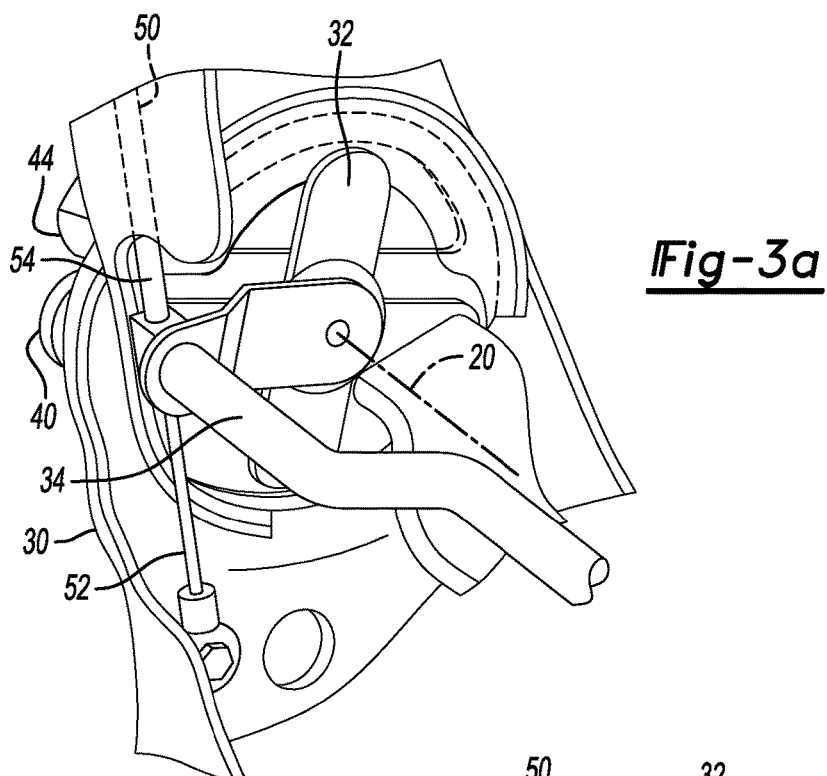
FIGS. 3a and 3b are perspective views illustrating actuation of a synchronization tube that may be provided with the seat assembly.
Figure 3B:
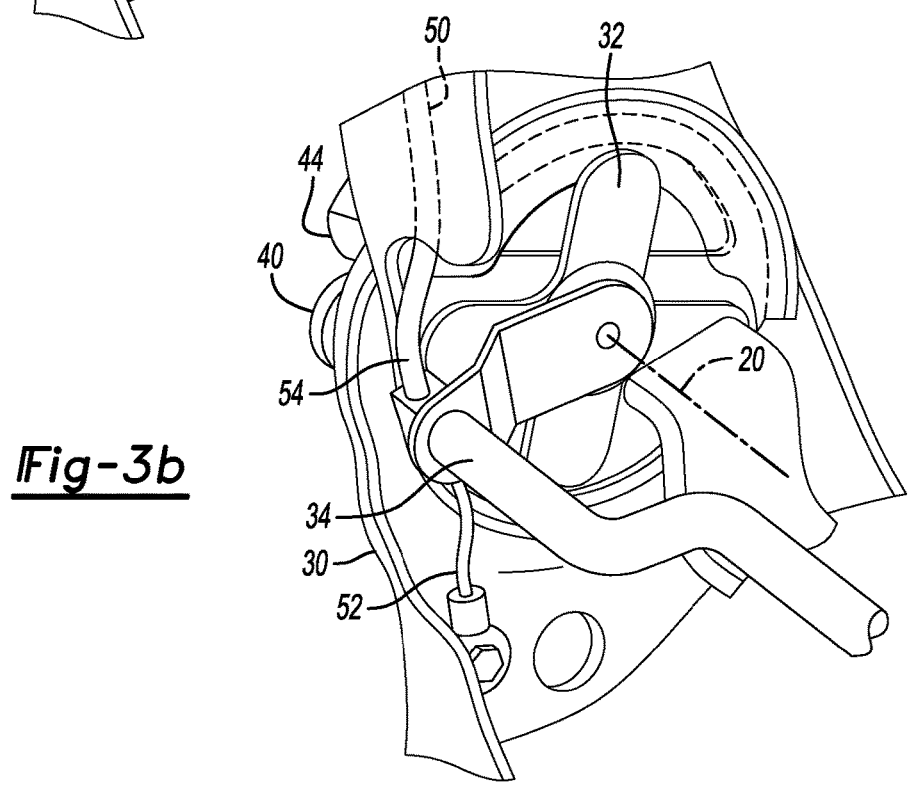

Referring to FIGS. 2, 3a, and 3b, the synchronization tube 34 may facilitate actuation of one or more recliner mechanisms 32 between the locked and unlocked positions. For example, the synchronization tube 34 may be connected to a center hub 46 of one or more recliner mechanisms 32. The synchronization tube 34 may be offset from the first axis 20 such that a portion of the synchronization tube 34 may not extend along or be coaxially disposed with the first axis 20. For example, the synchronization tube 34 may be disposed rearward of the first axis 20 or further from the front of the seat back 14 than the first axis 20 so that the synchronization tube 34 may be located further from a seat occupant to help improve seat comfort.

The synchronization tube 34 may move between a first position as shown in FIG. 3a and a second position shown in FIG. 3b. The recliner mechanism 32 may be locked when the synchronization tube 34 is in the first position. The recliner mechanism 32 may be unlocked when the synchronization tube is in the second position. The synchronization tube 34 may be actuated in any suitable manner. For example, the easy entry lever 24 may be operatively coupled to the recliner mechanism 32 and/or the synchronization tube 34 and may actuate the synchronization tube 34 from the first position to the second position and may actuate the recliner mechanism 32 from the locked position to the unlocked position. For instance, the synchronization tube 34 may be coupled to the easy entry lever 24 by a linkage 50. Actuation of the easy entry lever 24 may actuate the linkage 50, which in turn may actuate the synchronization tube 34 from the first position to the second position to unlock the recliner mechanism 32 and permit rotation of the seat back 14.

The linkage 50 may have any suitable configuration. For example, the linkage 50 may be configured as a Bowden cable that may include a cable 52 that may extend through a cable housing 54, which may also be referred to as a sheath or sleeve. It is contemplated that the linkage 50 may be configured to push or pull the synchronization tube 34 to actuate the synchronization tube 34 from the first position to the second position. In a "push" configuration, a first end of the cable 52 may be coupled to the easy entry lever 24 and a second end of the cable 52 may be fixedly disposed on a component associated with the seat bottom 12, such as the seat bottom frame 16 or the lower bracket 30. A first end of the cable housing 54 may be operatively connected to the easy entry lever 24 while a second end of the cable housing 54 may be disposed proximate and may engage the synchronization tube 34. Sufficient force exerted on the easy entry lever 24, such as when the easy entry lever 24 is pulled, may actuate the cable 52 with respect to the cable housing 54. In response, the cable housing 54 may push the synchronization tube 34 and the synchronization tube 34 may rotate about the first axis 20 from the first position shown in FIG. 3a to the second position shown in FIG. 3b, or in a counterclockwise direction with respect to the first axis 20 from the perspective shown. The synchronization tube 34 may return or may be permitted to move from the second position to the first position when the easy entry lever 24 is released or is not actuated.

Figure 4:
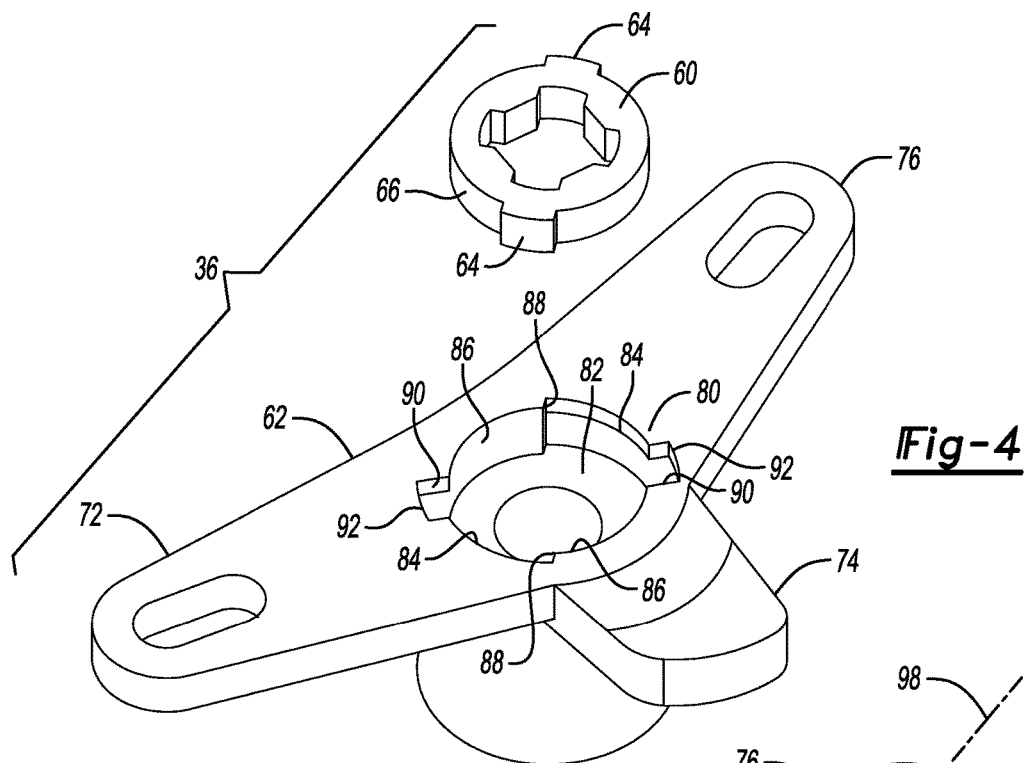
FIGS. 4 and 5 are exploded and assembled views of an actuator member that may be provide with the seat assembly.
Figure 5:
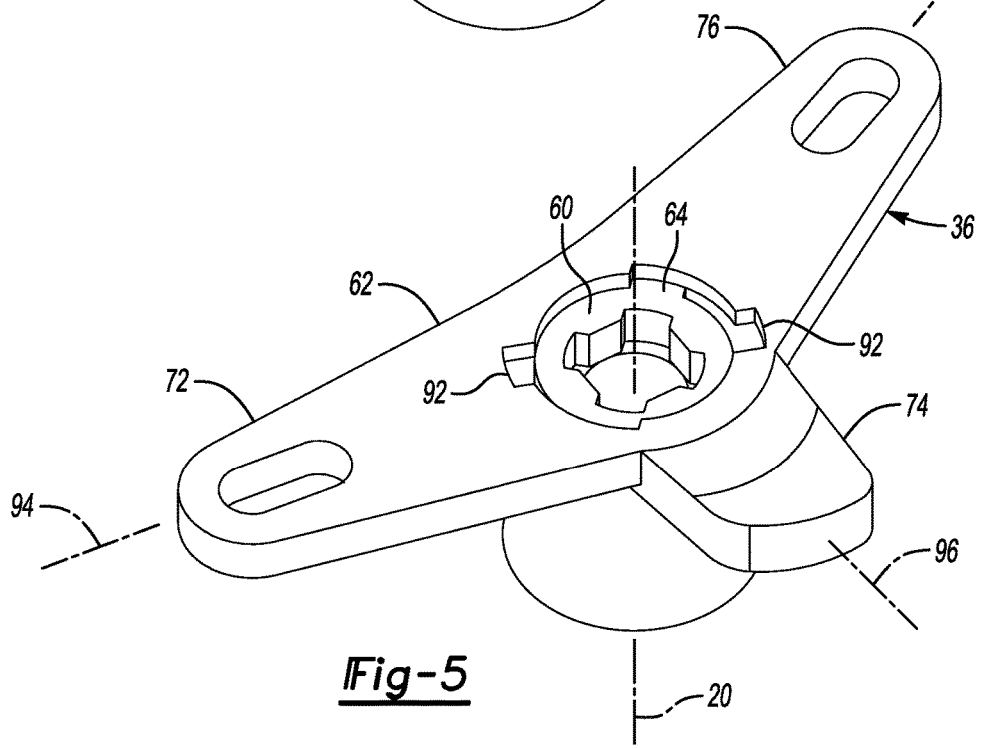

Referring to FIGS. 2, 4, and 5, the actuator member 36 may be disposed proximate the synchronization tube 34 and the center hub 46 of the recliner mechanism 32. For example, the actuator member 36 may be coupled to or may be received in the center hub 46 of a recliner mechanism 32 and may have a hole that may receive an end of the synchronization tube 34. The actuator member 36 may be configured to rotate about the first axis 20. In addition, the actuator member 36 may be disposed on an outboard side of the lower bracket 30 or on a side of the lower bracket 30 that may be disposed opposite an associated recliner mechanism 32. In at least one embodiment, the actuator member 36 may have an actuator ring 60 and an actuator body 62.

Referring to FIGS. 4 and 5, the actuator ring 60 may be disposed proximate an end of the synchronization tube 34 or an associated connecting member that may extend between the synchronization tube 34 and the actuator member 36. The actuator ring 60 may extend continuously around the first axis 20 to define a hole that may have a profile that may receive and mate with the synchronization tube 34 or an associated connecting member. As such, the actuator ring 60 may be fixedly disposed on the synchronization tube 34 such that the actuator ring 60 may rotate with the synchronization tube 34 about the first axis 20. The actuator ring 60 may include one or more tabs 64 that may protrude from an outer ring surface 66 or outside circumference of the actuator ring 60. The tabs 64 may be disposed opposite each other and extend away from the hole and the first axis 20. The tabs 64 may be configured to engage the actuator body 62.

The actuator body 62 may be configured to receive the actuator ring 60. In at least one embodiment, the actuator body 62 may include a bore 70 and one or more arms, such as a first arm 72, a second arm 74, and a third arm 76.

The bore 70 may receive the actuator ring 60 and may permit the actuator ring 60 to rotate about the first axis 20 with respect to the actuator body 62 over a limited rotational distance. For example, the bore 70 may be at least partially defined by a first wall 80, a second wall 82, a first arcuate surface 84, a second arcuate surface 86, a first step surface 88, and a second step surface 90. The actuator ring 60 may be completely received in the bore 70 in one or more embodiments.

The first wall 80 and the second wall 82 may cooperate to inhibit axial movement of the actuator ring 60 or movement of the actuator ring 60 along the first axis 20 when the actuator ring 60 is received in the bore 70. The first wall 80 may have one or more tab slots 92. The tab slots 92 may extend through the first wall 80 and may allow the actuator ring 60 to be inserted through the first wall 80 into the bore 70 when an associated tab 64 is aligned with a corresponding tab slot 92.

The second wall 82 may be spaced apart from the first wall 80. The second wall 82 may support the actuator ring 60 and inhibit axial movement of the actuator ring 60 toward the recliner mechanism 32.

At least one first arcuate surface 84 may extend from the first wall 80 to the second wall 82. In the embodiment shown in FIG. 4, a pair of first arcuate surfaces 84 is provided such that the first arcuate surfaces 84 are disposed opposite each other. The first arcuate surface 84 may be disposed at a first radial distance from the first axis 20. The first radial distance may be greater than or equal to a distance the tab slot 92 extends from the first axis 20 in one or more embodiments. As such, the first arcuate surface 84 may be disposed proximate an end surface of a tab 64.

At least one second arcuate surface 86 may extend from the first wall 80 to the second wall 82. In the embodiment shown in FIG. 4, a pair of second arcuate surfaces 86 are provided that are disposed opposite each other. The second arcuate surface 86 may be disposed at a second radial distance from the first axis 20. The second radial distance may be less than the first radial distance in one or more embodiments. As such, the second arcuate surface 86 may be disposed proximate the outer ring surface 66 and the second arcuate surface 86 is disposed closer to the first axis 20 than the first arcuate surface 84.

One or more first step surfaces 88 and one or more second step surfaces 90 may extend from the first wall 80 to the second wall 82 and may extend from the first arcuate surface 84 to the second arcuate surface 86. In the embodiment shown in FIG. 4 and as shown in FIG. 6, two first step surfaces 88 and two second step surfaces 90 are provided. The first step surfaces 88 and the second step surfaces 90 may extend away from the first axis 20 and may be configured to engage a corresponding tab 64 of the actuator ring 60 depending on the relative rotational positions of the actuator ring 60 and the actuator body 62. For example, the actuator ring 60 may rotate in the bore 70 and with respect to the actuator body 62 when a tab 64 does not engage a step surface 88, 90. In some circumstances, the actuator ring 60 may rotate with the actuator body 62 and may not rotate in the bore 70 with respect to the actuator body 62 when a step surface 88, 90 engages and exerts force against a tab 64.

Referring to FIG. 5, the first arm 72, second arm 74, and third arm 76 may be generally spaced apart from each other and may generally extend radially with respect to the first axis 20 in one or more embodiments. For example, the first arm 72 may extend along a first arm axis 94, the second arm 74 may extend along a second arm axis 96, and the third arm 76 may extend along a third arm axis 98.

Referring to FIG. 6, the first arm 72 may generally be disposed opposite the cam member 40. As such, the first arm 72 may be spaced apart from and may not engage the cam member 40. The first arm 72 may be operatively coupled to an actuating element, such as a handle, strap, cable, mechanical linkage, or the like, that may exert force on the first arm 72. Sufficient force exerted on the first arm 72 may overcome the biasing force of the actuator member spring 38 and may rotate the actuator member 36 about the first axis 20. As is best shown in FIG. 5, the first arm 72 may be offset from the second arm 74 such that the first arm 72 may not be coplanar with the second arm 74. For example, the first arm 72 may be disposed further from the seat bottom frame 16 and/or lower bracket 30 than the second arm 74 in one or more embodiments. In at least one embodiment, the first arm 72 may have a substantially the same length as the third arm 76 and may be longer than the second arm 74.

Referring to FIG. 6, the second arm 74 may be disposed between the first arm 72 and the third arm 76. The second arm 74 may be disposed closer to the seat bottom frame 16 and/or the lower bracket 30 than the first arm 72 and the third arm 76. The second arm 74 may be aligned with or may be disposed in a common plane with the cam member 40. As such, the second arm 74 configured to engage and actuate the cam member 40. For example, the second arm 74 may include a curved or arcuate end surface that may engage the cam member 40 and may facilitate rotation of the actuator member 36 and cam member 40 as will be discussed in more detail below.

The third arm 76 may be disposed between the first arm 72 and the second arm 74. The third arm 76 may be operatively coupled to an actuating element, such as a handle, strap, cable, mechanical linkage, or the like, that may exert force on the third arm 76. Sufficient force exerted on the third arm 76 may overcome the biasing force of the actuator member spring 38 and may rotate the actuator member 36 about the first axis 20. For example, the third arm 76 may be operatively coupled to the release lever 26 that may be actuated to release the seat back 14 to rotate toward the easy entry position and/or table fold position. The third arm 76 may be generally disposed opposite the first arm 72 and may be substantially coplanar with the first arm 72. In addition, the third arm 76 may be offset from the second arm 74 such that the third arm 76 may not be coplanar with the second arm 74 and may be disposed further from the seat bottom frame 16 and/or lower bracket 30 than the second arm 74 in one or more embodiments. As such, the third arm 76 may be configured to rotate over the cam member 40 and may not engage the cam member 40. In at least one embodiment, the third arm 76 may have a greater length than the second arm 74. The third arm 76 may be omitted in one or more embodiments, such as when a release lever 26 is not provided.

The actuator member spring 38 may exert a biasing force on the actuator member 36. From the perspective shown in FIGS. 6-14, the actuator member spring 38 may bias the actuator body 62 of the actuator member 36 in a first direction or counterclockwise about the first axis 20 from the perspective shown, which may help maintain engagement between the second step surface 90 and a corresponding tab 64. Rotation of the actuator ring 60 in a counterclockwise direction from the perspective shown may help actuate the recliner mechanism 32 toward the locked position.

In at least one embodiment, the actuator member spring 38 may be configured as a coil spring that may include a coil portion 100, a first end 102, and a second end 104. The coil portion 100 may extend around the first axis 20 and the actuator body 62 and may be disposed between the lower bracket 30 and the first arm 72, second arm 74, and/or third arm 76. The first end 102 may engage part of the actuator member 36 or an arm of the actuator body 62, such as the first arm 72. The second end 104 may be disposed opposite the first end 102 and may engage another component, such as component associated with the seat bottom 12, such as the seat bottom frame 16 or the lower bracket 30.

The cam member 40 may be configured to rotate about a second axis 110. For example, the cam member 40 may be rotatably disposed on a pin 112 that may extend along the second axis 110 and that may be fixedly disposed on the lower bracket 30. The second axis 110 may be spaced apart from and may be disposed generally parallel to the first axis 20. In at least one embodiment, the cam member 40 may include a first cam arm 114 and a second cam arm 116.

The first cam arm 114 may generally extend away from the second axis 110. The first cam arm 114 may have a curved surface 120 that may face toward and may engage the second arm 74 of the actuator member 36. As such, the second arm 74 may slide along the curved surface 120 when the actuator member 36 and/or cam member 40 rotate about their respective axes.

The second cam arm 116 may also generally extend away from the second axis 110. The second cam arm 116 may be arranged at an acute angle with respect to the first cam arm 114. In addition, the second cam arm 116 may be longer than the first cam arm 114 or may extend further from the second axis 110 than the first cam arm 114. In at least one embodiment, the second cam arm 116 may include an inner surface 130, an outer surface 132, and an end portion 134.

The inner surface 130 may face toward the first axis 20 and the actuator member 36. The second arm 74 may be disposed near or may engage the inner surface 130 to limit rotation of the actuator member 36 with respect to the cam member 40.

The outer surface 132 may be disposed opposite the inner surface 130. The outer surface 132 may be configured to selectively engage the stop member 44. The stop member 44 may be fixedly disposed on the seat back frame 22 and may extend over the lower bracket 30 to engage the outer surface 132. In addition, the stop member 44 may be disposed on an opposite side of the cam member 40 from the second arm 74.

Figure 7:
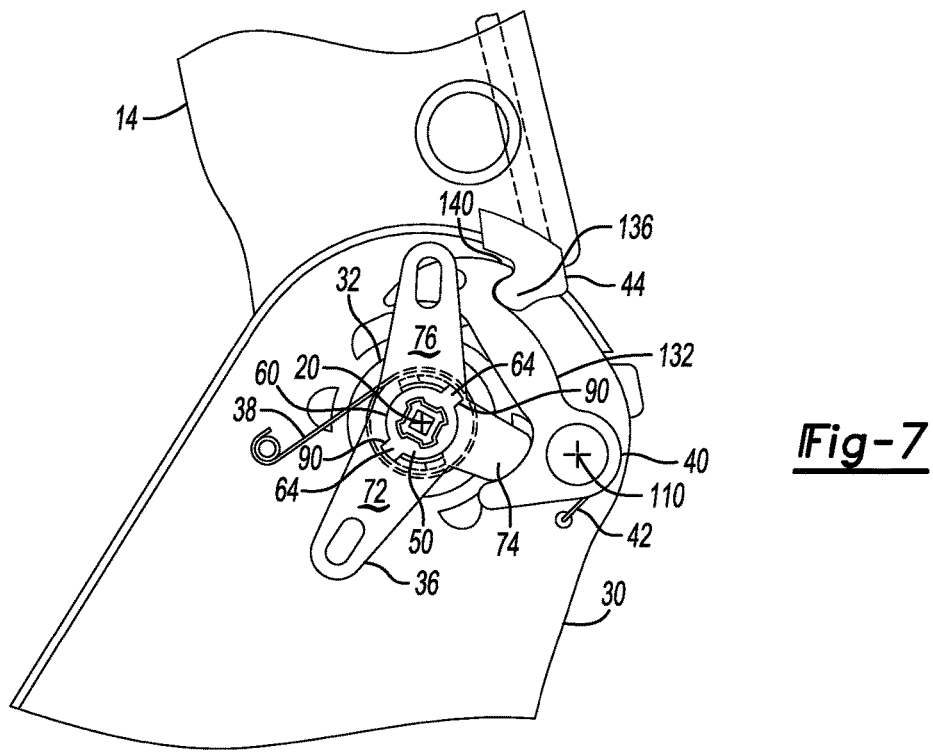
FIG. 7 is a side view of the seat assembly in an easy entry position.
Figure 14:
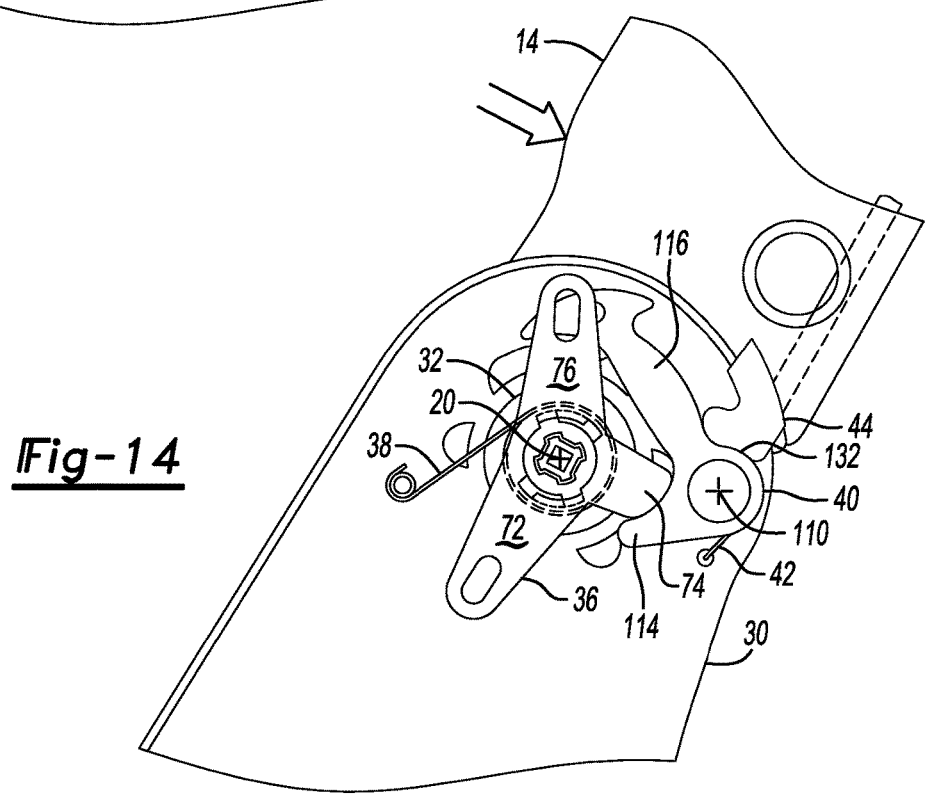
FIG. 14 is a side view of the seat assembly in an exemplary reclined position.

The stop member 44 may include a hook portion 136 that may hook against or mate with the end portion 134 when the seat back 14 is in the easy entry position as shown in FIG. 7 and may engage a portion of the cam member 40, such as a stop surface 138 that may extend at least partially around the pin 112 as shown in FIG. 14 to limit rotation of the seat back 14 away from the seat bottom 12.

The end portion 134 may be disposed at an end of the second cam arm 116. The end portion 134 may have a cam member hook portion 140 that may be disposed proximate the outer surface 132. The cam member hook portion 140 may be configured to engage the hook portion 136 of the stop member 44 when the seat back 14 is in the easy entry position as shown in FIG. 7. The end portion 134 may also include a cam member arcuate surface 142 that may be disposed at a distal end of the second cam arm 116 that may be disposed remotely from the second axis 110. As is best shown in FIG. 9, the cam member arcuate surface 142 may help guide the stop member 44 over or along the cam member arcuate surface 142 when the cam member 40 is rotated in the first direction or counterclockwise from the perspective shown in FIGS. 6-13 to permit the seat back 14 to rotate about the first axis 20 from the easy entry position toward the table fold position.

Referring to FIG. 6, the cam member spring 42 may bias the cam member 40 in a clockwise direction about the second axis 110 from the perspective shown in FIGS. 6-14. In at least one embodiment, the cam member spring 42 may be configured as a coil spring that may include a coil portion 150, a first end 152, and a second end 154. The coil portion 150 may extend around the second axis 110 and/or pin 112. As such, the coil portion 150 may be disposed between the lower bracket 30 and the cam member 40. The first end 152 may engage the cam member 40. The second end 154 may be disposed opposite the first end 152 and may engage a component associated with the seat bottom 12, such as the seat bottom frame 16 or lower bracket 30.

Referring to FIGS. 6-14, operation of the seat assembly 10 will now be described in more detail. In the discussion below, reference is made to clockwise and counterclockwise directions of rotation to facilitate understanding of the operation of the seat assembly 10 with respect to the perspective shown in the figures and is not intended to be limiting. For example, the clockwise and counterclockwise directions of rotation may be reversed if viewed from a different perspective or when an actuator member 36 disposed on an opposite side of the seat assembly 10 from that shown in FIGS. 6-14.

In FIG. 6, the seat back 14 is disposed in the design position. The actuator member 36 is shown in an initial position in which the recliner mechanism 32 may be locked to inhibit rotation of the seat back 14 about the first axis 20. One or more tabs 64 of the actuator ring 60 may be disposed proximate the corresponding first step surface 88 when the recliner mechanism 32 is in the locked position. The second arm 74 may engage the inner surface 130 of the cam member 40. The stop member 44 may engage the outer surface 132 of the cam member 40 and may be disposed between the end portion 134 and the stop surface 138 and may be spaced apart from the end portion 134 and the stop surface 138.

In FIG. 7, the seat back 14 is rotated in a first direction about the first axis 20 from the design position shown in FIG. 4 to the easy entry position. The first direction may be counterclockwise from the perspective shown. The seat back 14 may rotate from the design position to the easy entry position when the recliner mechanism 32 is unlocked. The recliner mechanism 32 may be unlocked by actuating the easy entry lever 24 to actuate the synchronization tube 34 from the first position to the second position as previously described.

Actuation of the synchronization tube 34 from the first position to the second position may rotate the actuator ring 60 in a second direction or clockwise from the position shown in FIG. 6 such that one or more tabs 64 may be disposed proximate or may engage a corresponding second step surface 90 of the actuator member 36, thereby inhibiting further clockwise rotation or further rotation of the actuator ring 60 in the second direction with respect to the actuator body 62. Once the recliner mechanism 32 is unlocked, the seat back 14 and its stop member 44 may rotate in the first direction or counterclockwise from the position shown in FIG. 6 to the position shown in FIG. 7. For example, the hook portion 136 of the stop member 44 may slide along the outer surface 132 of the cam member 40 and may engage and hook against the cam member hook portion 140, which may inhibit further counterclockwise rotation of the seat back 14 or further rotation of the seat back 14 in the first direction and hold the seat back 14 in the easy entry position. A biasing member, such as a spring, may be provided to help bias the seat back 14 in the first direction about the first axis 20. For example, a biasing member may bias the seat back 14 from the design position toward the easy entry position and/or the table fold position.

The seat back 14 may be held in the easy entry position and inhibited from further counterclockwise rotation or rotation in the first direction unless the actuator member 36 is actuated or rotated to allow the seat back 14 to rotate toward the table fold position, such as by pulling or exerting force on the first arm 72. Once the seat back 14 is in the easy entry position, the seat track 18 may be actuated from a latched condition in which fore/aft movement or forward/backward movement of the seat assembly 10 may be inhibited to an unlatched position in which the seat assembly 10 can move forward along the seat track 18 to provide more space to enter or exit a rear seating area or area of the vehicle disposed behind the seat assembly 10.

Figure 8:
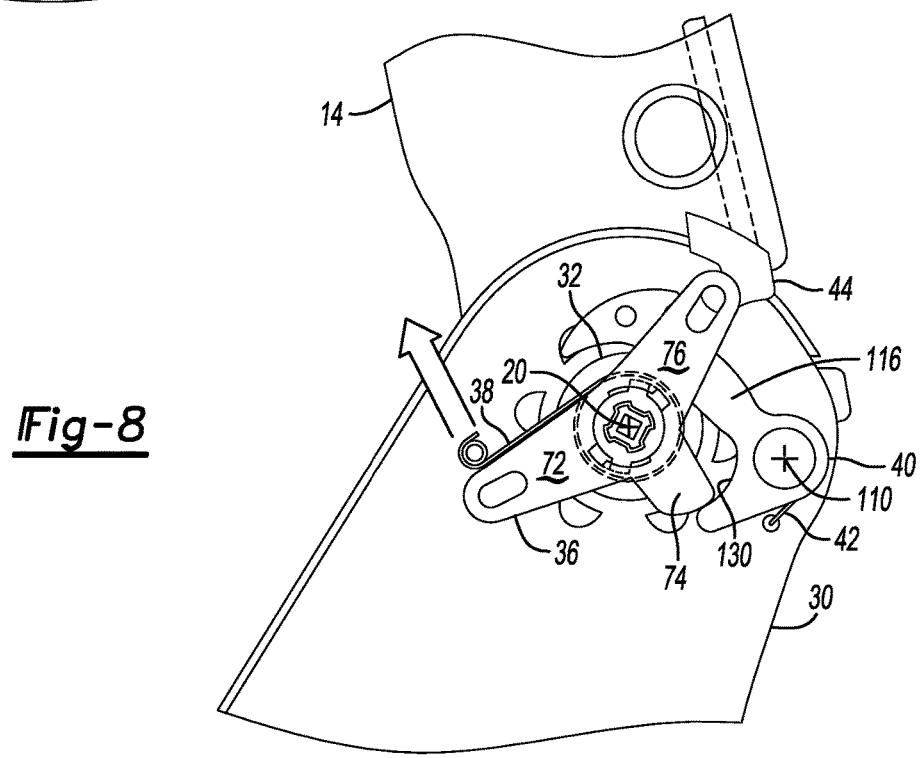
FIGS. 8 and 9 are side views of the seat assembly moving between the easy entry position and a table fold position.
Figure 9:
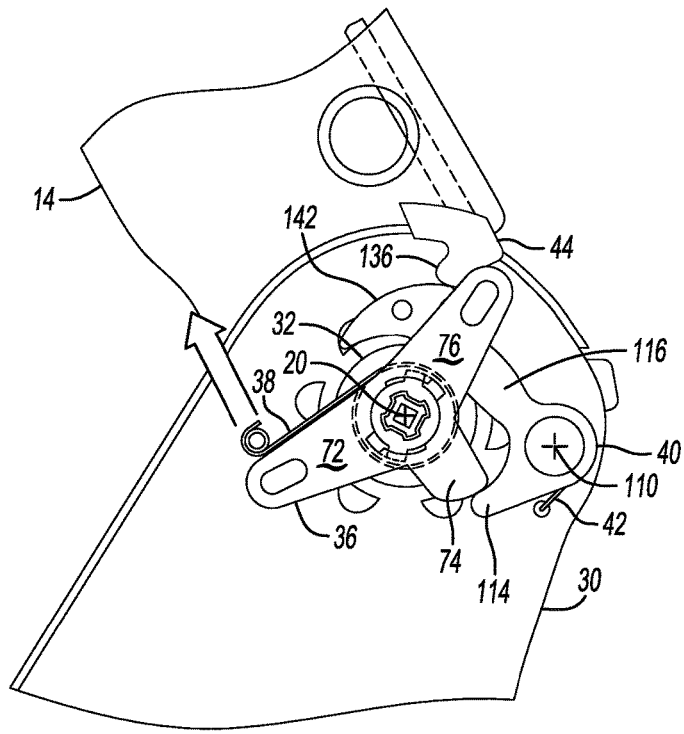

FIGS. 8-10 illustrate movement from the easy entry position to the table fold position. The recliner mechanism 32 may be unlocked when the seat back 14 rotates from the easy entry position to the table fold position. For example, the recliner mechanism 32 may be configured to remain in the unlocked position when the seat back 14 is not in the design position to facilitate movement from the easy entry position to the table fold position in one or more embodiments.

In FIG. 8, the actuator member 36 is shown rotated in a second direction or clockwise about the first axis 20 from the position shown in FIG. 7. The actuator member 36 may rotate to the position shown in FIG. 8 when sufficient force is exerted on the actuator member 36 or an arm of the actuator member 36, such as the first arm 72, as represented by the arrow. Alternatively, the actuator member 36 may rotate to the position shown in FIG. 8 when force is exerted on the third arm 76 in a direction that may extend toward the rear of the seat assembly 10. Rotation of the actuator member 36 may cause the second arm 74 to slide along the inner surface 130 and away from the second axis 110 and the second cam arm 116 and exert force on the first cam arm 114, which may cause the cam member 40 to rotate in a first direction about the second axis 110 or in a counterclockwise direction from the perspective shown. As such, the second arm 74 may rotate the cam member 40 about the second axis 110 when force is exerted on the first arm 72 to rotate the actuator member 36 about the first axis 20. Moreover, the cam member 40 may rotate and move away from the stop member 44 such that the second cam arm 116 of the cam member 40 may rotate toward the first axis 20 and may disengage the stop member 44 to permit the seat back 14 to continue to rotate in the second direction or a clockwise direction about the first axis 20 toward the table fold position. As such, the actuator member 36 and cam member 40 may rotate in opposite directions about the first axis 20 and the second axis 110, respectively, when the actuator member 36 actuates the cam member 40. A biasing member, such as a spring, may be provided to help bias the seat back 14 toward the table fold position.

In FIG. 9, the seat back 14 is rotated in the first direction or counterclockwise about the first axis 20 from the position shown in FIG. 8. The stop member 44 may be disposed proximate and may move along or across the cam member arcuate surface 142 of the second cam arm 116 of the cam member 40 as the seat back 14 is rotated. For example, the cam member hook portion 140 of the stop member 44 may engage and may slide across the cam member arcuate surface 142 as the seat back 14 rotates about the second axis 110.

In FIG. 10, the seat back 14 is rotated in the first direction or counterclockwise from the position shown in FIG. 9 and is shown in the table fold position. In the table fold position, the seat back 14 may be generally folded over the seat bottom 12 and the stop member 44 may be spaced apart from the cam member 40. In addition the stop member 44 may disengage and may be completely spaced apart from the cam member 40. The actuator member 36 may rotate in the first direction or counterclockwise under the biasing force of the actuator member spring 38 when a sufficient counteracting rotational force is not exerted on first arm 72. Accordingly, the actuator member 36 and cam member 40 may move back to the positions shown in FIG. 6. As such, the FIG. 10 shows the actuator member 36 and cam member 40 in substantially the same positions as shown in FIG. 6, in which the third arm 76 of the actuator member 36 may be disposed over the second cam arm 116 and/or over the cam member arcuate surface 142. The recliner mechanism 32 may or may not move back to the locked position when the seat back 14 is in the table fold position.

Figure 11:
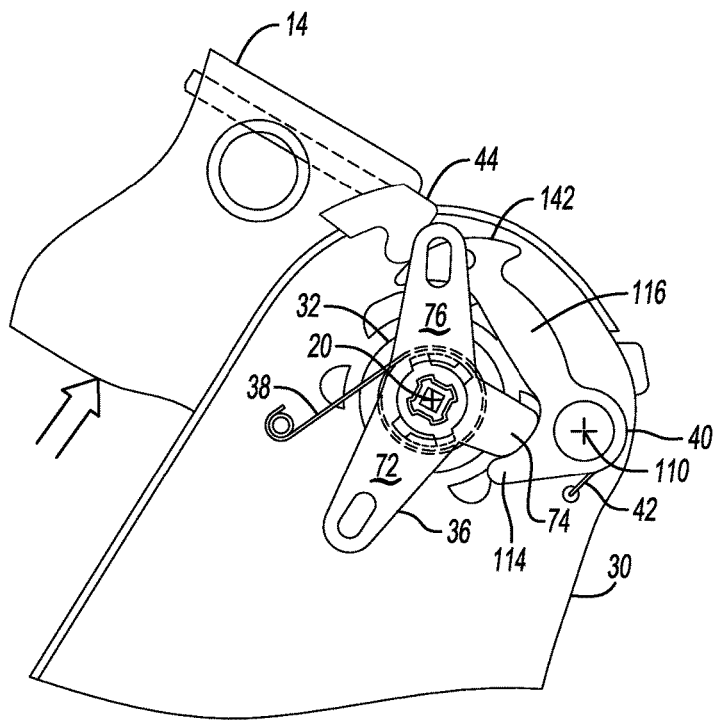
FIGS. 11-13 are side views of the seat assembly moving from the table fold position toward the design position.
Figure 12:
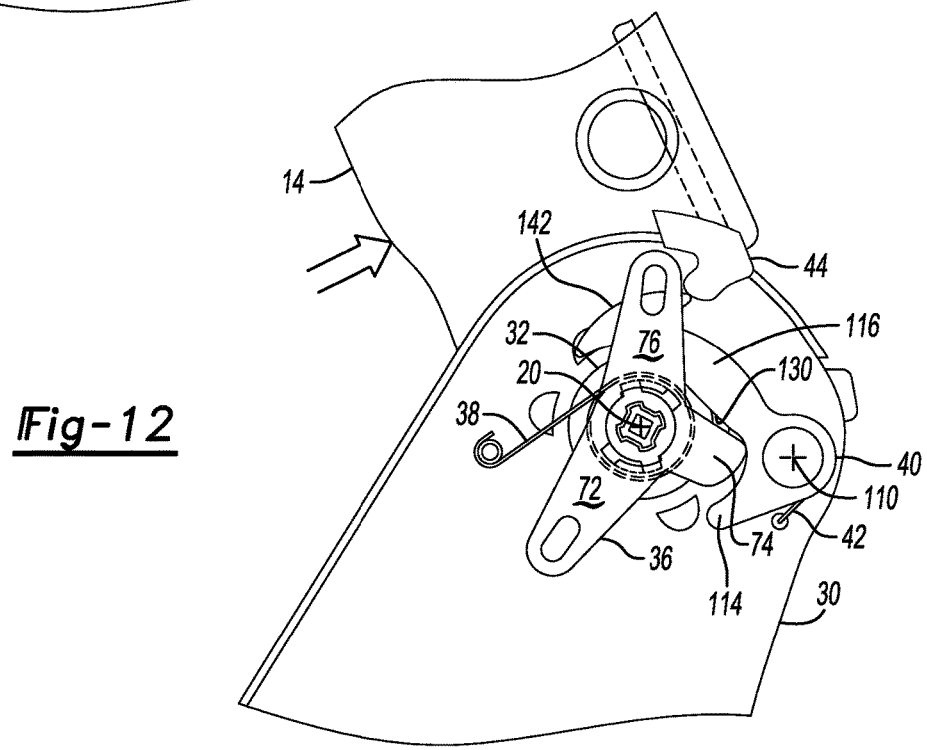
Figure 13:
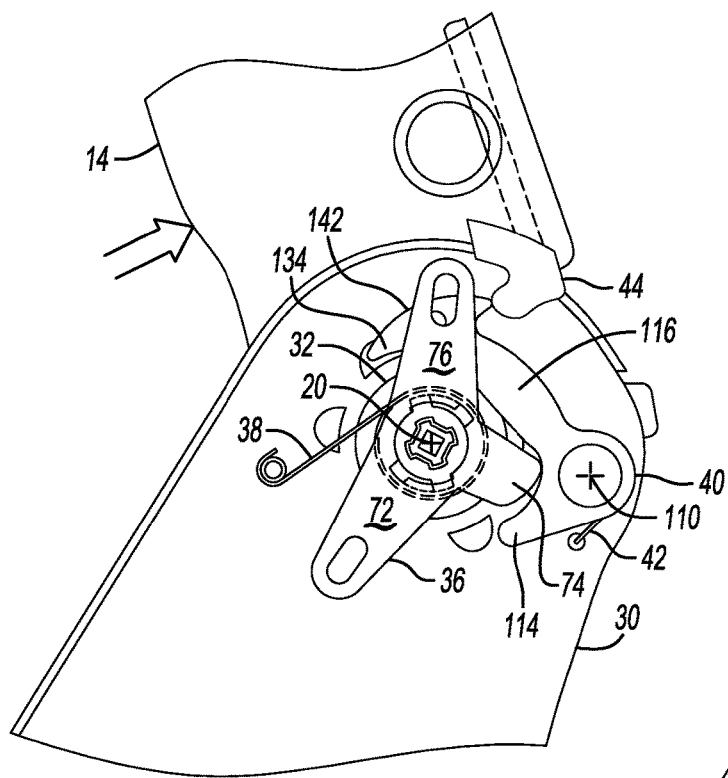

In FIGS. 11-13, movement of the seat back 14 from the table fold position toward the design position is shown. For clarity, these figures focus primarily on the rotation of the seat back and not on sliding of the seat assembly 10 along the seat track 18. The recliner mechanism 32 may remain unlocked or may be unlocked prior to rotation of the seat back 14 if the recliner mechanism 32 was locked when in the table fold position. The seat assembly 10 may slide along the seat track 18 back to its previous stationary position and the seat track 18 may be actuated to the latched condition before the recliner mechanism is unlocked, or the seat back 14 is permitted to return to the design position in one or more embodiments. Alternatively, the recliner mechanism 32 may be unlocked before the seat assembly 10 slides along the seat track 18 back to its previous stationary position and/or before the seat track 18 is actuated to the latched condition.

In FIG. 11, the seat back 14 is rotated in the second direction or clockwise about the first axis 20 from the position shown in FIG. 10. The seat back 14 may be actuated manually, such as by exerting force on the seat back 14 to push or pull the seat back 14 toward the design position as represented by the arrow that extends toward the seat back 14. The stop member 44 may engage and slide across the cam member arcuate surface 142 when the seat back 14 is sufficiently rotated away from the table fold position.

In FIG. 12, the seat back 14 is rotated in the second direction or clockwise from the position shown in FIG. 11. Movement of the stop member 44 across the cam member arcuate surface 142 may overcome the biasing force exerted by the cam member spring 42 and may cause the cam member 40 to rotate slightly counterclockwise from the position shown in FIG. 11. Rotation of the cam member 40 may cause the inner surface 130 of the cam member 40 to engage the second arm 74, which may limit further rotation of the cam member 40 in the first direction or counterclockwise from the perspective shown.

In FIG. 13, the seat back 14 is rotated in the second direction or clockwise from the position shown in FIG. 12 to a position in which the stop member 44 is about to disengage the end portion 134 of the cam member 40. The cam member 40 may rotate slightly in the second direction about the second axis 110 from the position shown in FIG. 12 due to the curvature of the cam member arcuate surface 142. Further rotation of the seat back 14 in the second direction may return the seat back 14 to the design position shown in FIG. 6. As such, the biasing force exerted by the cam member spring 42 may cause the cam member 40 to rotate in a second direction or clockwise about the second axis 110 from the perspective shown when the stop member 44 disengages the cam member arcuate surface 142. In one or more embodiments, the recliner mechanism 32 may automatically return to the locked position when the seat back 14 returns to the design position, presuming that the easy entry handle 24 has been released or that the synchronization tube 34 is not in the second position.

Referring to FIG. 14, the seat back 14 is shown in an exemplary reclined position. The seat back 14 may be rotated in the second direction or clockwise about the first axis 20 as compared to the design position shown in FIG. 6 when the seat back 14 is in the reclined position. The recliner mechanism 32 may be unlocked and force may be exerted on the seat back 14 to rotate the seat back 14 about the first axis 20 from the design position to the reclined position. The cam member 40 and the stop member 44 may cooperate to inhibit further rotation of the seat back 14 in a clockwise direction. For instance, the cam member 40 and the stop member 44 may engage and act as a hard stop that may inhibit further rotation of the seat back 14 about the first axis 20 in a clockwise direction from the perspective shown. In addition, the cam member 40 and the stop member 44 may engage and act as a hard stop to inhibit rotation of the seat back 14 about the first axis 20 away from the seat bottom 12, such as during or in response to a vehicle impact event.

The seat assembly 10 as described above may help reduce the number of parts and associated cost of a seat assembly, improve durability, and reduce assembly complexity of the seat assembly 10 by consolidating release functionality with the actuator member 36.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom;
   a seat back pivotally disposed on the seat bottom and configured to rotate about a first axis, the seat back having a stop member;
   an actuator member configured to rotate about the first axis; and
   a cam member that is configured to rotate about a second axis and that includes a first cam arm and a second cam arm, wherein the first cam arm continuously engages the actuator member and the second cam arm has a cam member hook portion that hooks onto the stop member when the seat back is in an easy entry position;
   wherein the actuator member and cam member rotate in opposite directions when the actuator member actuates the cam member.

2. The seat assembly of claim 1 wherein the seat bottom has a seat bottom frame and the seat assembly further comprises a seat track and a lower bracket, wherein the lower bracket extends between the seat bottom frame and the seat track, and the actuator member and cam member are disposed proximate the lower bracket.

3. The seat assembly of claim 1 wherein the cam member has a stop surface that extends at least partially around the second axis, wherein the stop member engages the stop surface to inhibit rotation of the seat back about the first axis away from the seat bottom.

4. The seat assembly of claim 1 wherein the cam member rotates toward the first axis to allow the stop member to disengage the cam member hook portion to allow the seat back to rotate from the easy entry position to a table fold position.

5. The seat assembly of claim 4 wherein the cam member has a cam member arcuate surface disposed proximate the cam member hook portion, wherein the stop member moves along the cam member arcuate surface when the seat back rotates from the easy entry position to the table fold position.

6. The seat assembly of claim 4 wherein the stop member does not engage the cam member when the seat back is in the table fold position.

7. A seat assembly comprising:
   a seat bottom having a lower bracket;
   a seat back;
   a recliner mechanism that rotatably couples the seat back to the seat bottom and facilitates rotation of the seat back about a first axis; and
   an actuator member that is disposed outside the recliner mechanism and on an opposite side of the lower bracket from the recliner mechanism, the actuator member being rotatable about the first axis, wherein the actuator member includes:
      an actuator body that has a bore; and
      an actuator ring that is received in the bore;
   wherein the actuator ring rotates in the bore with respect to the actuator body when the recliner mechanism is actuated from a locked position in which the recliner mechanism inhibits rotation of the seat back about the first axis to an unlocked position in which the recliner mechanism permits the seat back to rotate about the first axis.

8. The seat assembly of claim 7 wherein the recliner mechanism has a center hub that is rotatable about the first axis, wherein the actuator body is coupled to the center hub.

9. The seat assembly of claim 7 further comprising a synchronization tube, wherein the synchronization tube extends through the actuator body and the actuator ring is fixedly disposed on the synchronization tube.

10. The seat assembly of claim 7 wherein the actuator body has a first wall and a second wall that are spaced apart from each other and that cooperate to at least partially define the bore and inhibit movement of the actuator ring along the first axis.

11. The seat assembly of claim 10 wherein the first wall has a tab slot and the actuator ring has a tab, wherein the actuator ring is insertable into the bore when the tab is substantially aligned with the tab slot.

12. The seat assembly of claim 10 wherein the actuator body has a first step surface that is disposed between the first wall and the second wall and the actuator ring has a tab that is disposed proximate the first step surface when the recliner mechanism is in the locked position.

13. The seat assembly of claim 12 wherein the actuator body has a second step surface that is disposed between the first wall and the second wall and is spaced apart from the first step surface, wherein the tab is disposed proximate the second step surface when the recliner mechanism is in the unlocked position.

14. The seat assembly of claim 13 wherein the actuator body has a first arcuate surface and a second arcuate surface, wherein the first step surface extends from the first arcuate surface to the second arcuate surface, and wherein the second arcuate surface is disposed closer to the first axis than the first arcuate surface.

15. The seat assembly of claim 14 wherein the first arcuate surface extends from the first step surface to the second step surface.

16. A seat assembly comprising:
a seat bottom;
a seat back that rotates about a first axis with respect to the seat bottom;
a cam member that is disposed proximate the seat bottom and rotates about a second axis; and
an actuator member that rotates about the first axis and has a first arm, a second arm, and a third arm that is disposed between the first arm and the second arm, wherein the first arm is operatively connected to an easy entry lever and the third arm is operatively connected to a release lever that is disposed on the seat assembly;
wherein the second arm rotates the cam member about the second axis when force is exerted on the first arm to rotate the actuator member about the first axis.

17. The seat assembly of claim 16 wherein the first arm and the second arm extend away from the first axis and the second arm is offset from the first arm such that the second arm is disposed closer to the seat back than the first arm.

18. The seat assembly of claim 16 wherein the seat back includes a stop member and the cam member includes a first cam arm and a second cam arm, wherein the first cam arm engages the actuator member and the second cam arm has a cam member hook portion that hooks onto the stop member when the seat back is in an easy entry position.

19. The seat assembly of claim 16 further comprising a recliner mechanism that rotatably couples the seat back to the seat bottom and is rotatable about the first axis.

20. The seat assembly of claim 16 further comprising an actuator member spring that biases the actuator member to rotate in a first direction about the first axis and a cam member spring that biases the cam member to rotate in a second direction about the second axis.

* * * * *